United States Patent [19]

Mayer

[11] Patent Number: 4,790,735
[45] Date of Patent: Dec. 13, 1988

[54] MATERIALS PROCESSING USING CHEMICALLY DRIVEN SPHERICALLY SYMMETRIC IMPLOSIONS

[75] Inventor: Frederick J. Mayer, Ann Arbor, Mich.

[73] Assignee: KMS Fusion, Inc., Ann Arbor, Mich.

[21] Appl. No.: 918,637

[22] Filed: Oct. 14, 1986

Related U.S. Application Data

[60] Continuation of Ser. No. 742,035, Jun. 6, 1985, abandoned, which is a division of Ser. No. 538,210, Oct. 3, 1983, Pat. No. 4,552,742.

[51] Int. Cl.$^4$ ............................................. B29C 67/00
[52] U.S. Cl. ........................................ 425/1; 102/201; 376/152; 376/914
[58] Field of Search ................. 425/1, 405 H; 264/84; 376/914, 152; 102/201; 219/121 LM

[56] References Cited

U.S. PATENT DOCUMENTS

| | | | |
|---|---|---|---|
| 3,220,103 | 11/1965 | Simons | 425/1 |
| 3,317,035 | 5/1967 | Cannon | 206/525 |
| 3,346,102 | 10/1967 | Strong | 206/525 |
| 3,499,732 | 3/1970 | Garrett | 423/446 |
| 3,528,372 | 9/1970 | Lewis et al. | 102/201 |
| 3,529,324 | 9/1970 | Kawai | 425/1 |
| 3,653,792 | 4/1972 | Garrett | 425/1 |
| 3,659,972 | 5/1972 | Garrett | 425/1 |
| 4,522,680 | 6/1985 | Ogawa | 156/624 |

FOREIGN PATENT DOCUMENTS

| | | | |
|---|---|---|---|
| 1033565 | 7/1953 | France . | |
| 1399638 | 7/1975 | United Kingdom | 376/152 |

Primary Examiner—Willard E. Hoag
Attorney, Agent, or Firm—Barnes, Kisselle, Raisch, Choate, Whittemore & Hulbert

[57] ABSTRACT

A system for obtaining spherically symmetrical implosion of sample materials by directing radiant ignition energy onto a target which includes a spherically symmetrical core of selected sample material concentrically surrounded by a shell of high explosive material. The resulting implosive compression produces hydrodynamically controlled physical and/or chemical and/or metallurgical transformations of state in the sample material.

17 Claims, 2 Drawing Sheets

MATERIALS PROCESSING USING CHEMICALLY DRIVEN SPHERICALLY SYMMETRIC IMPLOSIONS

REFERENCE TO RELATED APPLICATIONS

This is a continuation of co-pending application Ser. No. 742,035 filed on June 6, 1985, which was a division of application Ser. No. 538,210 filed Oct. 3, 1983, now U.S. Pat. No. 4,552,742.

The present invention is directed to materials processing, and more particularly to methods and apparatus for the spherically symmetric implosive compression of matter.

BACKGROUND OF THE INVENTION

It has heretofore been proposed to induce polymorphic transition of graphite to diamond by subjecting a starting material to high pressure shock compression. The U.S. Pat. Nos. 3,499,732, 3,653,792 and 3,659,972, to Garrett for example, propose the use of shaped electrically detonated explosive charges to obtain spherically symmetrical implosion shock waves for forming diamonds from graphite or for sintering powdered metals. One significant problem associated with this technique is one of physical size: the mass of explosive material involved would be on the order of thirty kilograms. An explosion of this size requires extraordinary containment precautions, and also raises problems in connection with recovery and contamination of the sample. Smaller explosive masses cannot be uniformly ignited using the electrical detonation techniques proposed in the art.

Another significant problem with the above proposed techniques is the lack of control of the implosive pressure afforded by shock compression techniques. Yet another problem with the electrically ignited explosive system is that of achieving a high degree of spherical symmetry in the detonating explosive.

OBJECTS AND SUMMARY OF THE INVENTION

It is an object of the present invention, therefore, to provide a system and method for implosive compression of materials which reduces the need for elaborate containment structures, which obtains uniform implosion of the sample material, which provides for more ready product recovery, which reduces the introduction of impurities in the sample, and/or which affords hydrodynamic control of the implosive pressures in the sample material.

Another and more specific object of the invention is to provide a system and method for obtaining uniform implosion energies of reduced scale, and thereby alleviating the aforementioned deficiencies in the art.

A further object of the invention is to provide a system and method of the described type which obtains increased pressure at low temperature from spherical shock compression, and thereby reduces retransformation of the product due to post-shock heating.

Another object of the invention is to provide a system and means for accurately tailoring the pressure-time history of the implosively compressed sample to chemically and/or physically and/or metallurgically change the sample's final state.

Briefly stated, the foregoing and other objects of the invention are obtained by uniformly illuminating a spherical target, including a sample material surrounded by explosive, with a pulsed laser, ion, electron or microwave beam to ignite the explosive and thereby obtain uniform spherical implosive compression of the material sample. In the preferred embodiments of the invention, the target comprises a thin ignition layer and a shell of high explosive concentrically surrounding a sample material, either with or without a surrounding transparent tamper shell. The target illumination system comprises lenses and/or reflectors for focusing ignition energy uniformly over the target surface. Uniform spherically symmetrical high explosive ignition is expected to be most easily attained using pulsed laser energy and an optical system designed to provide spherical illumination (hereafter denoted by "spherical optical system"). Hence, the combination of the pulsed energy and a spherical optical system is used in the preferred embodiment in the following. However, by using many beams, energetic electron, ion and microwave energy sources could be used in spherical ignition systems. Energetic, pulsed, incoherent light sources in combination with a spherical ignition system may also be used.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
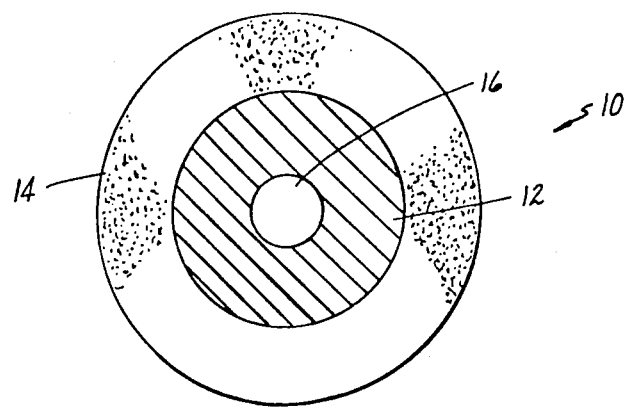
FIG. 1 is an elevational bisectional view of an implosive compression target in accordance with a basic embodiment of the invention.

FIG. 1 illustrates a target 10 of the present invention as comprising an inner shell 12 of sample material to be implosively compressed contiguously surrounded by a shell 14 of high explosive material. The interior 16 of shell 12 is preferably a vacuum or low pressure air. Each of the shells 12,14 is of radially uniform thickness, with the overall outside diameter of target 10 being in the range of several millimeters to several tens of centimeters. The dimensions shown in FIG. 1 are exemplary. The implosive compression of the spherical shell 12 is produced by the uniform laser ignition of the outer surface of the high explosive shell 14, whereupon the outer region explodes and the concomitant reaction force implodes and therefore compresses the "payload". (Here and in the following, "payload" refers to all of materials which are initially driven inward by the explosive forces). The uniform laser light ignition of spherical target 10 may be accomplished using a number of different methods. One method uses a number of individual laser beams and focusing lens, a second uses two laser beams and a spherical system of ellipsoidal mirrors (FIG. 2).

Figure 2:
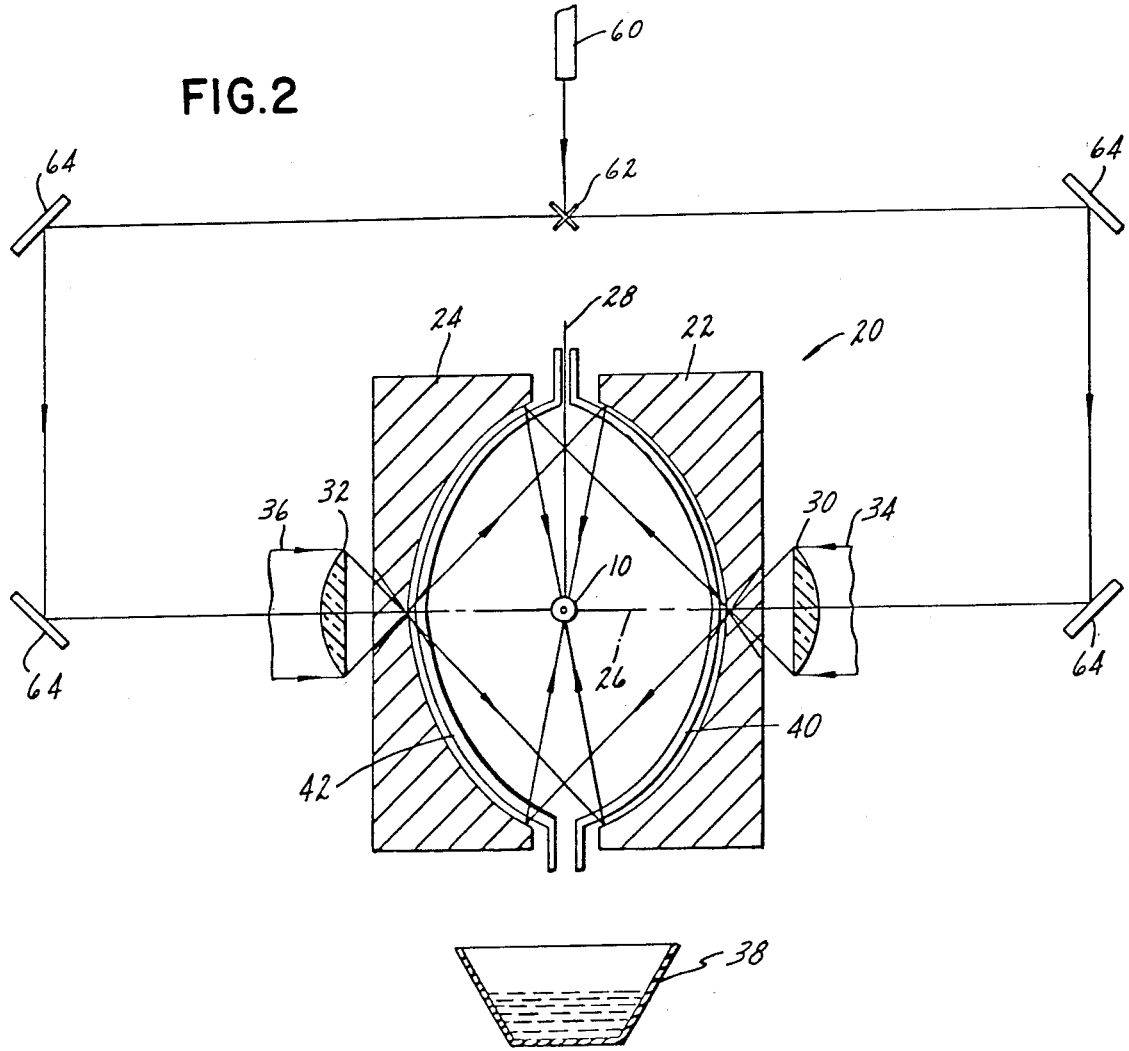
FIG. 2 is a schematic diagram of an optical system for focusing laser ignition energy onto the target of FIG. 1.

FIG. 2 illustrates an illumination system 20 for directing laser ignition energy uniformly over the surface of target 10. System 20 includes a pair of centrally apertured concave ellipsoidal reflectors 22,24 disposed on a common axis 26 such that the near focus of each reflector is disposed on axis 26 at or near the midpoint between the reflectors and the far focus of each reflector is disposed on axis 26 at the central opening of the opposing reflector. A target 10 is suspended by a thin wire 28 on axis 26 at the common reflector focus. A pair of lenses 30,32 are disposed externally of reflectors 22,24 on axis 26 for focusing associated collimated beams of laser energy 34,36 through the adjacent reflector aperture to the far focus of the opposing reflector, and thence onto the opposing reflector surface and over target 10. The incoming laser beams 34,36 may be generated by a suitable pulsed laser amplifier system 60 which directs energy onto a 50/50 beamsplitter/reflector 62. The split beams are directed along paths of equal length to lenses 30,32 by the mirrors 64.

The system 20 thus directs pulsed laser energy substantially uniformly over the target surface. The basic system 20, to the extent thus far described, is similar to that disclosed in Thomas, "Laser Fusion Illumination System," *Applied Optics*, 14, 6 (June 1975) pp. 1267–1273. The U.S. Pat. Nos. 4,017,163, to Glass, Sigler 4,084,887 and 4,136,926, and Thomas et al 4,161,351, and Brueckner et al, "Ellipsoidal Illumination System Optimization for Laser Fusion Experiments," *Applied Optics*, 14, 6 (June 1975) pp. 1274–1278 discloses improvements which may be incorporated into the basic Thomas system.

In operation, opposing collimated beams of pulsed laser energy are directed with spherical uniformity around the target surface and ignite high explosive shell 14. A spherically symmetrical detonation is launched in shell 14, which both implodes and compresses the material of shell 12. The implosive detonation accelerates the matter of shell 12 toward the center of symmetry, impacting shell 12 upon itself, and thereby raising the density, pressure and temperature in such a way as to induce physical and/or chemical and/or metallurgical changes of state. An important advantage of spherical implosion techniques of the type described lies in the strong increase in density and pressure obtained from spherical convergence at relatively low temperatures, as has been determined by Guderley, *Luffahrtforschung* 19, 302, (1942). This lower temperature, obtained using spherical shock compression in accordance with the present invention, helps avoid retransformation of the product material back to its initial form. Furthermore, the high explosive material will expand radially outwardly during the compression of the payload. Thus, no high-density material remains in thermal contact with the compressed material sample. This helps prevent contamination and aids in cooling. A cup 38 is positioned beneath reflectors 22,24 for collecting the compressed sample. Cup 38 may include an oil or water quench further to reduce retransformation.

Target 10 is constructed using standard machining and/or molding techniques. High explosives layers can be cast and/or machined to size. For the formation of diamond from an implosion-induced polymorphic transition in graphite, shell 12 may comprise graphite in pure form or with catalytic materials as in Cowan U.S. Pat. No. 3,401,019. Ultra-hard boron nitride for industrial machining may be formed by implosion-induced polymorphic transition of cubic and/or wurtzite forms of boron nitride. The process of the invention may also be employed for implosion-induced polymerization, sintering of ceramic or refractory metals, compaction of metal alloys, and possibly for creation of metallic hydrogen.

Explosive shell 14 may be constructed of any of a variety of explosives, for example, those known as HMX, PETN, TATB, etc. (See B. M. Dobratz, Lawrence Livermore Laboratory, Report #UCRL-52997). Such explosives typically possess an energy density of about 5 kJ/g and a mass density of 1 to 2 g/cc. For a shell 14 having an ID of 6 mm and an OD of 1 cm, explosive energy released would be about 5 kJ. Such an explosion may be easily contained, and yet will support a "payload" having an ID of 2 mm and a mass of about 1 g. The peak pressure at the target surface can be as high or higher than 200 kiloatmosphere while the "stagnation pressure" at a distance of 13 cm, i.e. at the reflector surfaces, would be only about 10 atmospheres. The pressure impulse would have a decay time of several microseconds. In order to protect the reflector surfaces, sacrificial liners 40,42 made, for example, of soft transparent plastic may be employed.

Figure 3:
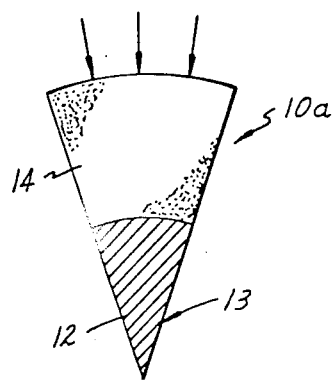
FIGS. 3-11 are fragmentary sectional drawings illustrating various target constructions in accordance with the invention.
Figure 4:
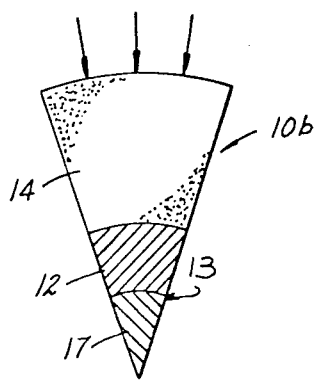
Figure 5:
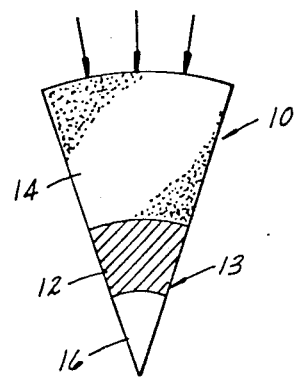

FIG. 3 illustrates a basic target 10a in accordance with the invention as comprising a core 13 consisting of a solid sphere of sample material 12. Core 13 is contiguously and entirely surrounded by a shell 14 of explosive material. The outer surface of core 13 and the thickness of shell 14 are of respectively uniform radial dimension. In the target 10b of FIG. 4, the core 13 includes a shell of sample material 12 surrounding a mandrel 17. Mandrel 17 is a sphere of solid material, such as aluminum, which prevents implosion pressures in sample material 12 from becoming too large and helps control the pressure wave profile in time. FIG. 5 illustrates the target 10 of FIG. 1 wherein the sample material shell 12 of core 13 surrounds a void 16.

Figure 6:
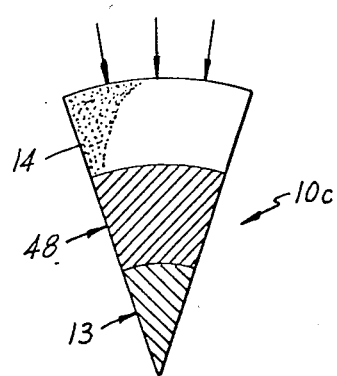
Figure 7:
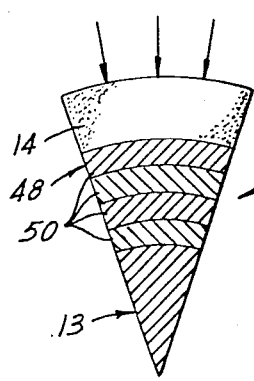

In the target 10c of FIG. 6, a malleable wave shaping layer or "pusher" shell 48 of iron, for example, is positioned between explosive shell 14 and core 13. The function of pusher shell 48 is to obtain desired tailoring of the hydrodynamic pressure and temperature profiles during implosive compression of sample core 13 by extending the time that peak pressure is applied to the sample. In the target 10d of FIG. 7, pusher 48 consists of multiple contiguous concentric shells 50 of materials having differing density for obtaining more complex pressure and temperature profile tailoring. This design allows a more nearly isentropic sample compression, as has been suggested for planar geometry by Lyzenga and Ahrens (in Shock Waves in Condensed Matter, American Institute of Physics Conference Proceedings #78, 1981). Isentropic compression reduces the sample temperature rise induced by shock waves. Core 13 in FIGS. 6 and 7 may, of course, be any of those illustrated in FIGS. 3–5.

Figure 8:
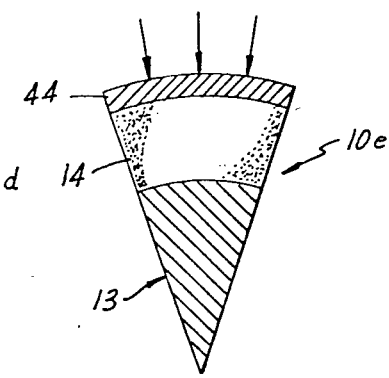
Figure 9:
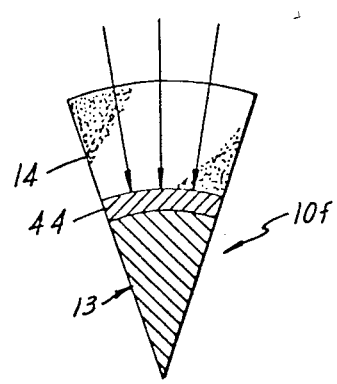

In order to ignite explosive shell 14, laser energy at a fluence density of up to 100 joule/cm$^2$ from a 25 ns Nd-glass or ruby laser may be employed. A given explosive material in shell 14 will require a certain amount of ignition energy per unit area, which is readily determined by experimentation. FIG. 8 illustrates a modified target 10e for lowering the required ignition energy by providing a thin (on the order of 1000 Å) coating or ignition layer 44 of aluminum, for example, over the explosive shell 14 or a thin layer of chemical explosive having low ignition sensitivity. Use of a thin ignition layer is described in connection with planar geometries by Yang et al, *Applied Physics Letters*, 19, 473 (1971) and in U.S. Pat. No. 3,812,783. Layer 44 may be formed by standard vacuum deposition or chemical evaporation techniques. For this target design, ignition energy of up to 10 joules/cm$^2$ and laser pulse length of 10 ns may be required. FIG. 9 illustrates another modified design 10f wherein the ignition layer 44 is disposed between explosive shell 14 and core 13, and explosive shell 14 is transparent for admitting laser energy. The design of FIG. 9 has the advantage that the unburned mass of explosive shell 14 operates to "tamp" the explosive energy. Again, any of the cores 13 in FIGS. 3-5 may be employed in FIGS. 8-9. Likewise, pusher shells 48 (FIGS. 6-7) may be positioned between explosive shell 14 and core 13 in FIG. 8, or between layer 44 and core 13 in FIG. 9.

Figure 10:
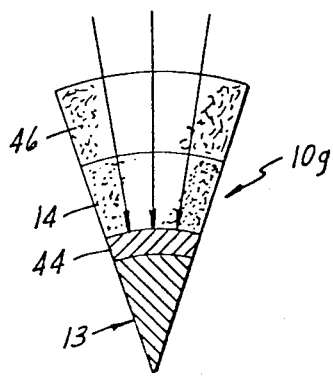
Figure 11:
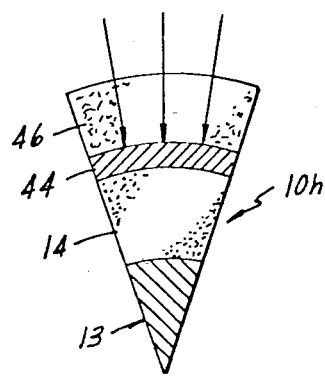

FIGS. 10 and 11 illustrate "tamped" target designs 10g and 10h. In both FIGS. 10 and 11, the outer shell or layer (44 in FIG. 11, 14 in FIG. 10) is surrounded by a spherically continuous transparent glass or plastic tamper shell 46. Most preferably, tamper shell 46 is sufficiently thick and resilient to absorb the explosive energy without rupture, which greatly facilitates both product collection and protection of the illumination optics. SYLGARD 184 marketed by Dow-Corning may be appropriate for construction of shell 46. Such a shell is formed by standard molding techniques.

It is an important feature of this invention to provide for hydrodynamic control of the pressure and temperature time-histories through the use of layered target structures as shown at 10 through 10h. This procedure is similar in character to the hydrodynamic control used to design inertial fusion targets (see Lindl, U.S. Pat. No. 4,272,320 and Brueckner, U.S. Pat. No. 4,297,165), although the end result is quite different. In the present invention, the sample material is implosively processed and then recovered, whereas inertial fusion targets are totally destroyed. In the present invention, such hydrodynamic control is employed to obtain desired physical, and/or chemical and/or metallurgical changes of state in the recovered sample material.

The invention claimed is:

1. A target for exposure to radiant energy to obtain implosive shock compression of materials comprising a spherical core including a spherically symmetrical sample of a said material concentrically surrounded by a symmetrical shell of high explosive material, and multiple spherically symmetrical radially contiguous shells of malleable materials of differing densities between said core and said shell of explosive material for limiting and extending application of peak pressure to the sample material.

2. A target for exposure to radiant energy to obtain implosive shock compression of materials comprising a spherical core including a spherically symmetrical sample of a said material concentrically surrounded by a symmetrical shell of high explosive material, and a shell of ignition material abutting with said shell of explosive material and responsive to said radiant energy for igniting said explosive material.

3. The target set forth in claim 2 wherein said shell of ignition material surrounds said shell of explosive material.

4. The target set forth in claim 2 wherein said shell of ignition material is disposed between said shell of high explosive material and said core, said shell of high explosive material being transparent to said radiant energy.

5. A target for exposure to radiant energy to obtain implosive shock compression of materials comprising a spherical core including a spherically symmetrical sample of a said material concentrically surrounded by a symmetrical shell of high explosive material, and a spherically symmetric tamper shell transparent to said radiant energy contiguously surrounding said target said core and all shells of said target being in sequential radial abutment.

6. The target set forth in claim 5 wherein said tamper shell is of sufficient thickness and resilience to contain detonation of said shell of explosive material without rupture.

7. A target for exposure to radiant energy to obtain explosive shock compression of materials, said target consisting of multiple spherically symmetrical radially abutting target layers including a central core having a spherically symmetrical sample of said material and a shell of high explosive material concentrically surrounding said core.

8. The target set forth in claim 7 wherein said shell of high explosive material includes a spherically symmetrical distribution of ignition material contiguous with said high explosive material and responsive to radiant energy for igniting said explosive material.

9. The target set forth in claim 8 wherein said core includes a solid sphere of said sample material.

10. The target set forth in claim 8 further comprising at least one spherically symmetrical shell of malleable material between said core and said shell of explosive material for limiting and extending application of peak pressure to the sample material.

11. The target set forth in claim 8 wherein said spherically symmetrical distribution of ignition material comprises a shell of ignition material contiguous with said shell of explosive material and responsive to said radiant energy for igniting said explosive material.

12. The target set forth in claim 8 further comprising a spherically symmetric tamper shell transparent to said radiant energy contiguously surrounding said target.

13. The target set forth in claim 8 wherein said ignition material comprises means responsive to absorption of laser energy for igniting said explosive material.

14. A target for exposure to radiant energy to obtain explosive shock compression of materials, said target consisting of multiple spherically symmetrical radially abutting target layers including a central core having a spherically symmetrical sample of said material, a shell of high explosive material concentrically surrounding said core, said shell of high explosive material including a spherically symmetrical distribution of ignition material contiguous with said high explosive material and responsive to radiant energy for igniting said explosive material, and multiple radially contiguous shells of malleable material having differing material densities positioned between said core and said shell of explosive material for limiting and extending application of peak pressure to the sample material.

15. A target for exposure to radiant energy to obtain explosive shock compression of materials, said target consisting of multiple spherically symmetrical radially abutting target layers including a central core having a spherically symmetrical sample of said material in the form of a hollow spherical shell of said material and a shell of high explosive material concentrically surrounding said core, said shell of high explosive material including a spherically symmetrical distribution of ignition material contiguous with said high explosive material and responsive to radiant energy for igniting said explosive material.

16. The target set forth in claim 15 wherein the interior of said sample material shell is evacuated.

17. The target set forth in claim 15 wherein said core further comprises a mandrel of a solid sphere of material disposed within and contiguously surrounded by said sample material shell.

* * * * *